(12) United States Patent
Wei et al.

(10) Patent No.: US 12,321,044 B2
(45) Date of Patent: Jun. 3, 2025

(54) OPTICAL LENS DESIGN FOR FLATTENING A THROUGH-FOCUS CURVE

(71) Applicant: Johnson & Johnson Vision Care, Inc., Jacksonville, FL (US)

(72) Inventors: Xin Wei, Irvine, CA (US); Philippe F. Jubin, Jacksonville, FL (US); Derek Nankivil, Jacksonville, FL (US); Minghan Chen, Jacksonville, FL (US); Gregory Williby, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 18/381,129

(22) Filed: Oct. 17, 2023

(65) Prior Publication Data

US 2024/0045234 A1   Feb. 8, 2024

Related U.S. Application Data

(63) Continuation of application No. 17/034,017, filed on Sep. 28, 2020, now Pat. No. 11,822,153.

(51) Int. Cl.
*G02C 7/02* (2006.01)
*G02C 7/04* (2006.01)
*G02C 7/06* (2006.01)

(52) U.S. Cl.
CPC ............. *G02C 7/047* (2013.01); *G02C 7/027* (2013.01); *G02C 7/028* (2013.01); *G02C 7/06* (2013.01); *G02C 2202/24* (2013.01)

(58) Field of Classification Search
None
See application file for complete search history.

(56) References Cited

U.S. PATENT DOCUMENTS

| | | |
|---|---|---|
| 6,712,467 B1 | 3/2004 | Kitani |
| 2009/0079940 A1 | 3/2009 | Dai |
| 2010/0134754 A1 | 6/2010 | Hong et al. |
| 2010/0302505 A1 | 12/2010 | Wooley |
| 2014/0268034 A1 | 9/2014 | Wooley |
| 2015/0250585 A1 | 9/2015 | Rosen |
| 2015/0320547 A1 | 11/2015 | Rosen et al. |
| 2016/0062145 A1 | 3/2016 | Brennan |
| 2017/0146820 A1 | 5/2017 | Brennan et al. |
| 2017/0176772 A1 | 6/2017 | Bakaraju et al. |
| 2018/0243082 A1 | 8/2018 | Zheleznyak |
| 2018/0329228 A1 | 11/2018 | Brennan et al. |
| 2019/0235279 A1 | 8/2019 | Hones et al. |

FOREIGN PATENT DOCUMENTS

| | | |
|---|---|---|
| EP | 3667402 | 6/2020 |
| ES | 2277705 | 7/2008 |
| WO | WO 2012173891 | 12/2012 |

OTHER PUBLICATIONS

Fritsch et al., Monotone Piecewise Cubic Interpolation, SIAM J. Numerical Analysis, vol. 17, 1980, pp. 238-246.
International Search Report and written opinion PCT/IB2021/058600 mailed Feb. 2, 2022.

*Primary Examiner* — Darryl J Collins

(57) ABSTRACT

Described herein are systems and/or methods for forming an ophthalmic lens. An example method may comprise a step of determining a power profile based on a power profile function defined by a base optical power, an amount of spherical aberration at a radial distance from a geometric center of the lens, and a bump function. The example method may comprise a step of adjusting the power profile based at least on minimizing a shape metric of a through-focus curve.

15 Claims, 17 Drawing Sheets

OPTICAL LENS DESIGN FOR FLATTENING A THROUGH-FOCUS CURVE

This application is a continuation application of U.S. Ser. No. 17/034,017, filed Sep. 28, 2020, which is hereby incorporated by reference.

BACKGROUND

Myopia, presbyopia, and emerging presbyopia have high prevalence rates in many regions of the world. One concern with myopia is its possible progression to high myopia, for example greater than five or six diopters, which dramatically affects one's ability to function without optical aids. High myopia is also associated with an increased risk of retinal disease, cataracts, and glaucoma. Moreover, lens wearers may experience asthenopia using conventional lenses. WO/2012/173891 describers a central zone in a lens that is surrounded by a rapidly increasing power distribution generating a perceivable blur to the user that causes an attendant increase in effective depth of focus. The depth of focus is increased to relieve stress from overall accommodative effort and stress from accommodation and accommodative lag to retard myopia progression and enable continuous and long term treatment by the user. However, improvements in lens design are needed. Additionally, or alternatively, improvements in correcting presbyopia and/or emerging presbyopia are desired.

SUMMARY

Described herein are systems and/or methods for forming an ophthalmic lens. An example method may comprise a step of determining a power profile based on a power profile function defined by a base optical power, an amount of spherical aberration at a radial distance from a geometric center of the lens, and a bump function. A method may comprise forming a lens by configuring a main body of the lens such that at least an intensity of light propagating through the lens is changed to exhibit a target apodization profile. The intensity of light propagating through the lens may be changed by apodizing the lens. The example methods may comprise a step of adjusting the power profile based at least on minimizing a shape metric (e.g., through-focus flatness metric, curvature, slope, RMS) of a through-focus curve. As an example, the power profile may be configured based on flattening a through-focus curve at or adjacent a target vergence. The example method may comprise a step of forming a lens to exhibit the adjusted power profile.

Described herein are systems and/or methods for forming an ophthalmic lens. An example ophthalmic lens may comprise a main body configured to exhibit a power profile based on a power profile function defined by a base optical power, an amount of spherical aberration at a radial distance from a geometric center of the lens, and a bump function. The power profile may be optimized based at least on minimizing a shape metric of a through-focus curve. In certain aspects, the bump function may comprise a multifocal function.

Described herein are systems and/or methods for forming an ophthalmic lens. An example ophthalmic lens may comprise a main body configured to exhibit a power profile based on a power profile function defined by a base optical power, an amount of spherical aberration at a radial distance from a geometric center of the lens, and a bump function. The power profile may provide vision correction and may be further optimized to slow myopia progression or treat emerging presbyopia or presbyopia based at least on minimizing a shape metric of a through-focus curve.

Described herein are systems and/or methods for forming an ophthalmic lens. An example method may comprise a step of determining a power profile based on a power profile function defined by a base optical power, an amount of spherical aberration at a radial distance from a geometric center of the lens, and a bump function. The example method may comprise a step of adjusting the power profile based at least on minimizing a shape metric of a through-focus curve. The example method may comprise a step of forming a lens to exhibit the adjusted power profile.

The lenses, systems, and methods described herein may provide vision correction, which may be based on a wearer's need. The lenses, systems, and methods described herein may be effective in slowing myopia progression. The lenses, systems, and methods described herein may be effective in treating presbyopia or emerging presbyopia.

BRIEF DESCRIPTION OF THE DRAWINGS

The following drawings show generally, by way of example, but not by way of limitation, various examples discussed in the present disclosure. In the drawings:

FIG. 3A shows the power profile. FIG. 3B shows the power profile with refraction subtracted to highlight the manner in which the designs might vary with refraction.

DETAILED DESCRIPTION

Figure 1:
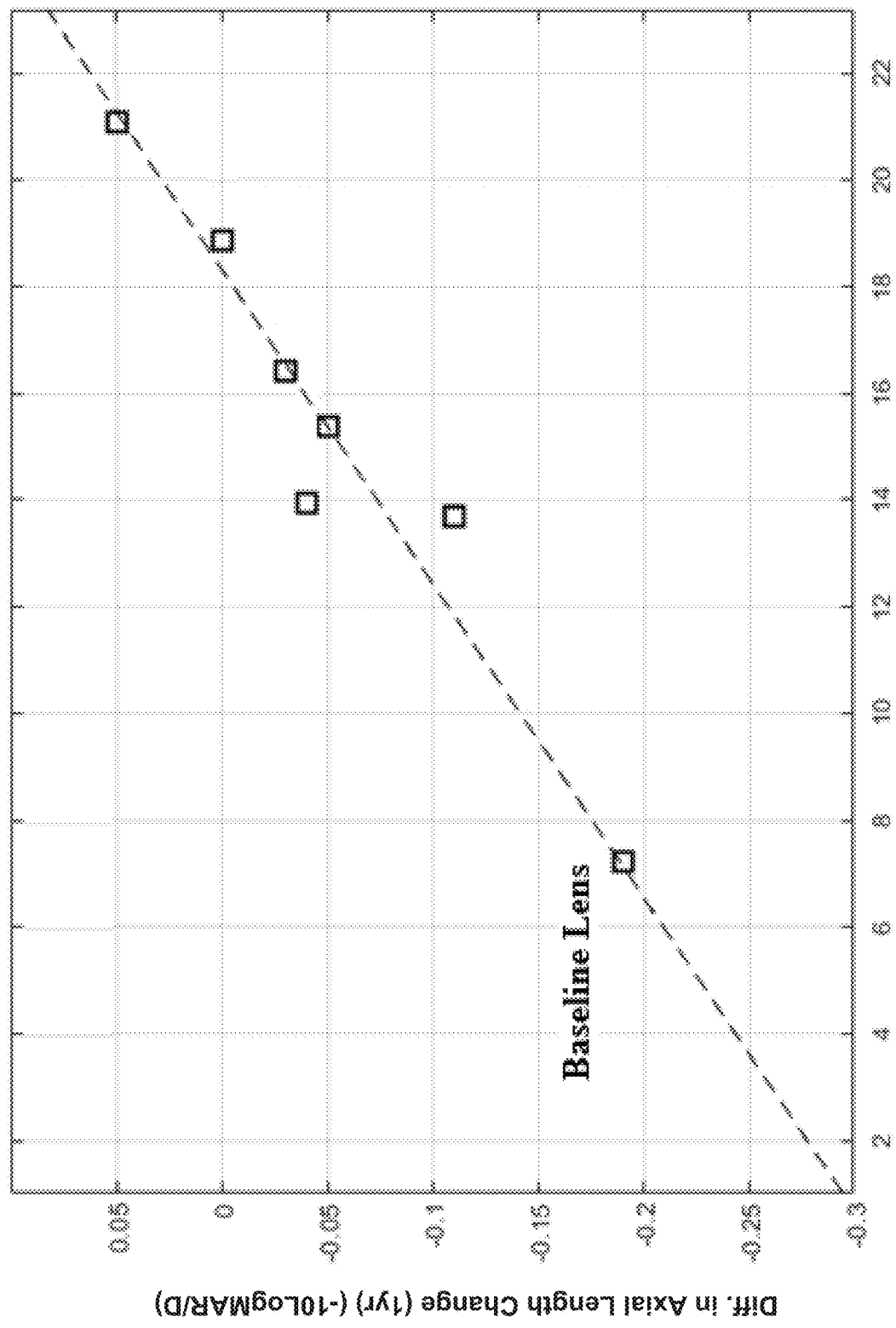
FIG. 1 shows example correlations between a flatness of a through-focus retinal image quality and an observed axial length treatment efficacy for different contact lens designs.
Figure 2A:
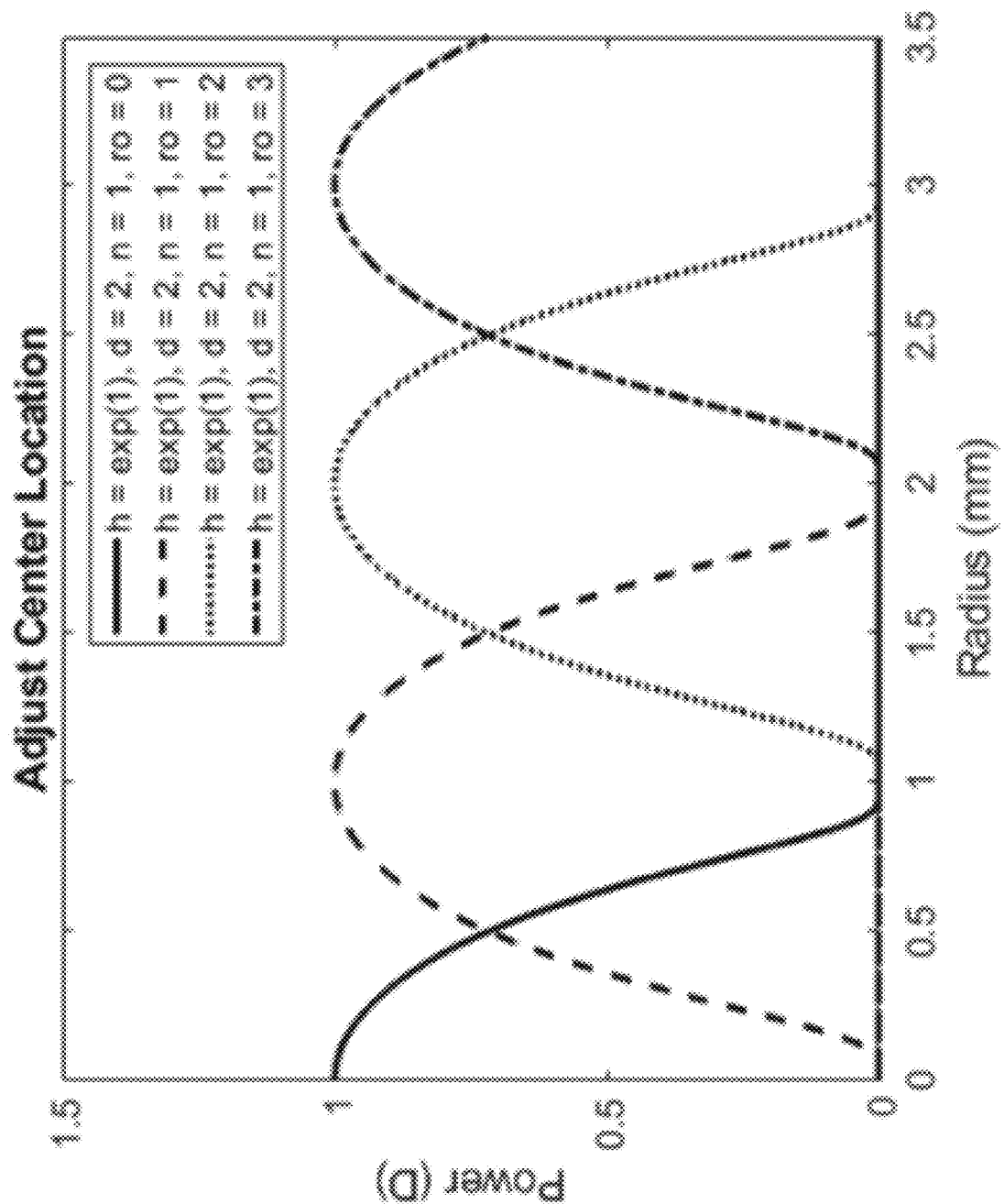
FIG. 2A shows example bump functions with adjusted center location.
Figure 2B:
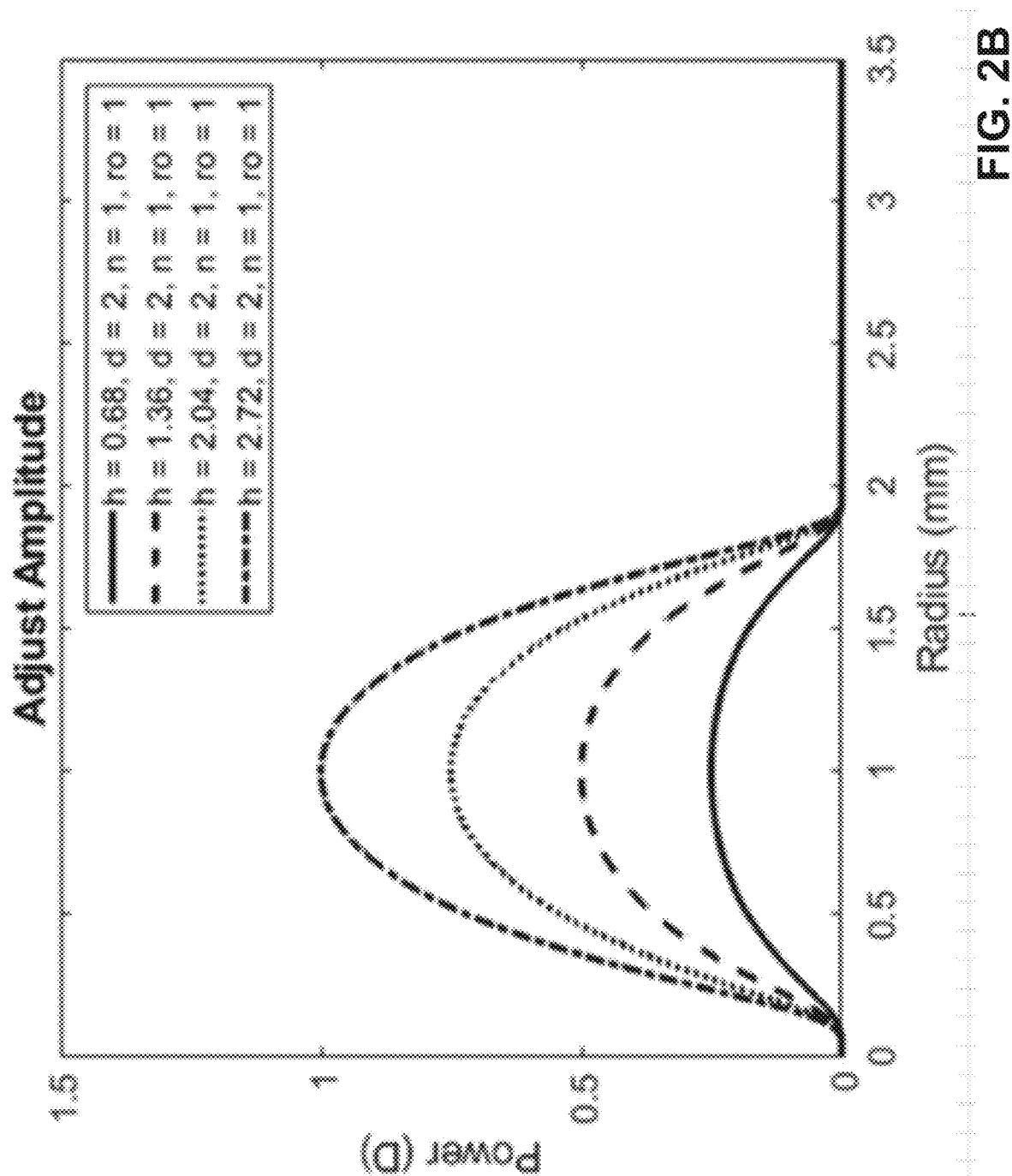
FIG. 2B shows example bump functions with adjusted amplitude.
Figure 2C:
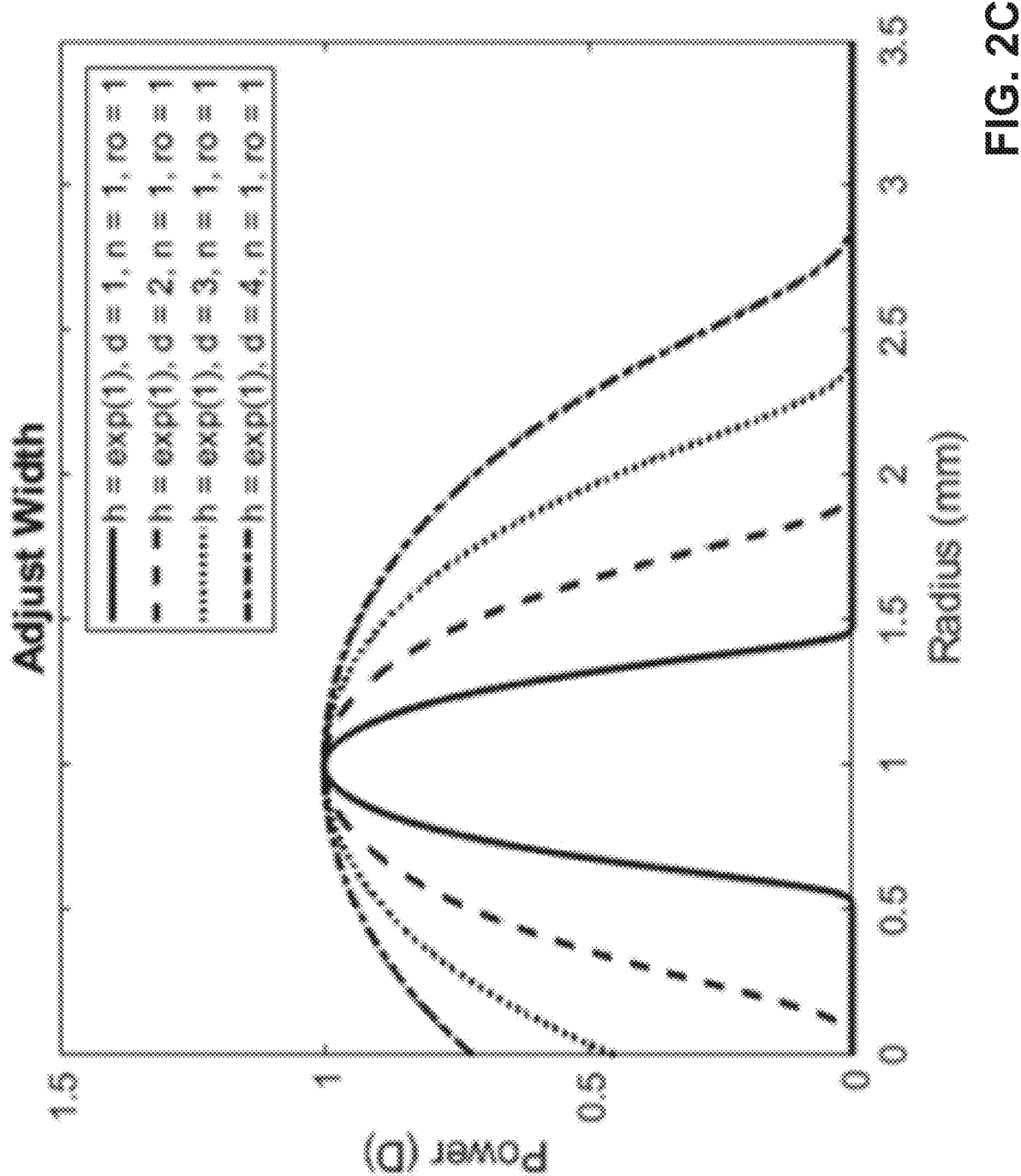
FIG. 2C shows example bump functions with adjusted width.
Figure 2D:
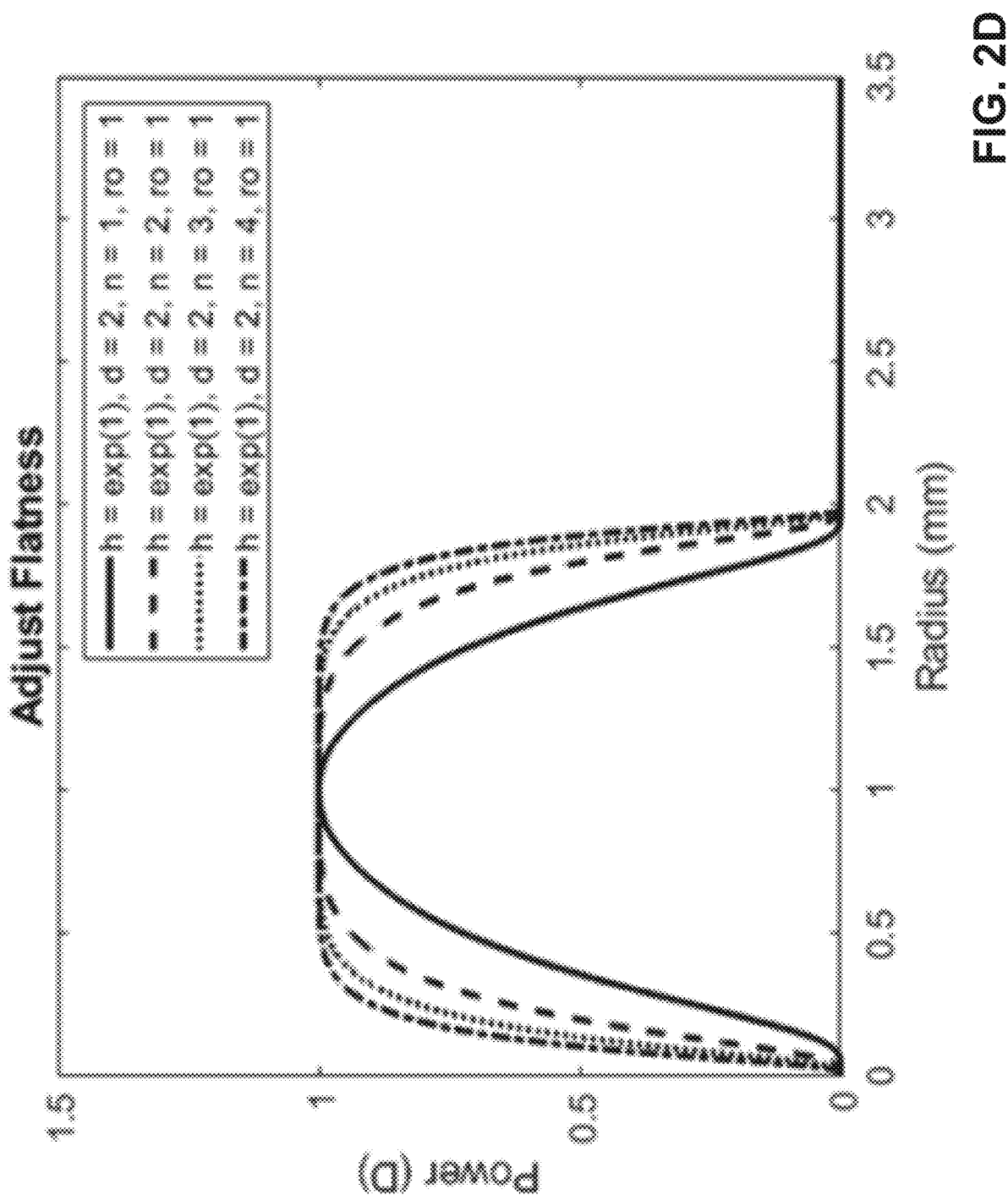
FIG. 2D shows example bump functions with adjusted flatness.

The present disclosure recognizes a relationship between flatness of a through-focus curvature associated with a lens and the effectiveness for slowing myopia progression.

As an illustrative example, myopia can be thought of as occurring because the eye has grown too long for the focal length of the optical system. It has been shown that near work is a significant risk factor for the development and progression of myopia. Meanwhile, humans often exhibit accommodative lag or negative spherical aberration during near work, resulting in hyperopic blur. As a result, the eye grows to attempt to bring the image into focus, resulting in progression of myopia. For this to occur, the eye must have some mechanism for detecting the sign of wavefront divergence, myopic or hyperopic. The asymmetry of the point spread function through-focus may aid in the eye's ability to detect the sign of wavefront divergence, obtained through-focus by some other mechanism. The strength of that signal is then linked to the steepness or flatness of the through-focus curve. A steeper through-focus curve results in a stronger more reliable signal and a flatter curve results in a weaker signal. Thus, given that hyperopic blur is likely to be present, it may be desirable to attenuate the detected signal by providing a flatter through-focus curve.

As such, novel lens designs and methods may take into account this relationship such that the formed lens may be used to provide vision correction and to slow myopia progression in a wearer. As described in the present disclosure, lens designs may be configured to flatten through-focus curves, while providing functional vision correction. It is noted that although bifocal lenses have also shown efficacy in slowing myopia progression, such bifocal lenses often sacrifice visual acuity. As described herein, lenses that have been configured with flatter through-focus curves (e.g., minimized shape metric of the through-focus curve), for example, by incorporating a particular bump function as part of the power profile of a lens, provide improved vision over a bifocal lens (e.g., baseline lens having a power profile shown in FIG. 13), while demonstrating potential at slowing myopia progression. Example designs are also applicable in vision corrections for presbyopes or emerging presbyopes.

Described herein are systems and/or methods for forming an ophthalmic lens. An example method may comprise a step of determining a power profile based on a power profile function. The power profile function may be defined by a base optical power, an amount of spherical aberration at a radial distance from a geometric center of the lens, and a bump function. The term bump function may be defined as a mathematical representation that results in a "bump" or deviation (e.g., increase) in and underlying curve. As an example, a bump function as used herein may represent a bump or positive deviation in optical power in a discrete portion of a lens, for example, relative to radial position. Although the term bump function is used, a multi-focal function creating a plurality of "bumps" in a resultant power profile may be used. As an illustrative example, spherical aberration and/or parameters of a bump function may be configured based on a characteristic of a target population. A target population may comprise one or more individuals. A target population may comprise a plurality of eyes that have a common characteristic. Example characteristics defining a target population may comprise those having myopia progression (e.g., pediatrics with myopia progression) or those having emerging presbyopia. Such characteristic may comprise pupil size or vergence variance, or prescription strength, or a combination. Other characteristics may be used. Characteristics may comprise one or more of pupil size or vergence variance for a particular prescription.

The example method may comprise a step of adjusting the power profile based at least on minimizing a shape metric (e.g., through-focus flatness metric, curvature, slope, RMS) of a through-focus curve. The term minimizing may be defined as a desire for the least amount of deviation at or near a target vergence. The term minimizing may be defined as a desire for the least amount of deviation as represented by a desire to minimize a rate of change and extent of change of a through-focus curve. However, a completely flat through-focus curve may not provide appropriate vision correction and thus, a balance between factors may be necessary. Thus, minimizing is not necessarily defined as the minimum, but instead is used as a determinative factor toward a flatter curve, as described herein. As an example, one or more power profiles may be adjusted based on an increased flatness of the curvature of an associated through-focus curve compared to the non-adjusted profile.

As used herein, a through-focus flatness (TFF) metric may be defined by:

$$TFF = \int_{v_{t-\delta}}^{v_{t+\delta}} \left| \frac{df(v)}{dv} \right| dv, \tag{1}$$

where $v_t$ is the target vergence, and $\delta$ is a vergence deviation about the target vergence (in an example embodiment, $\delta$ is between 0.05 and 0.3D including endpoints and intervening endpoints), f(v) is the through-focus visual performance (visual acuity) which, by definition, varies with vergence, v. Other ranges may be used. For example, $\delta$ may be between 0.1 and 0.3D (including endpoints and intervening endpoints, or $\beta$ may be between 0.001 and 0.10D including endpoints and intervening endpoints. For these purposes, v and $\delta$ are typically expressed in units of Diopters and f(v) is typically expressed in units of −10 logMAR. The through-focus flatness metric used herein is the integral of the absolute value of the derivative (the slope) of the through-focus visual performance function taken around the target vergence. Thus, a smaller flatness metric corresponds to flatter through-focus visual performance near the target vergence. Minimizing a shape metric of a through-focus curve may comprise minimizing the through-focus flatness metric defined herein.

An example method may comprise a step of forming a lens to exhibit the adjusted power profile. Forming a lens may comprise configuring the geometric shape of the lens. Forming a lens may comprise configuring the internal gradient refractive index profile of the lens. Forming a lens may comprise configuring the geometric shape of the lens and the internal gradient refractive index profile of the lens. Forming a lens may comprise configuring a main body of the lens such that light propagating through the lens is refracted to exhibit an adjusted power profile. The intensity of light propagating through the lens may be changed through apodization. The apodization of the lens may be based on a transmittance profile, which may take any form. As an example, a transmittance profile may vary radially from the center of the lens. As another example, the transmittance profile may be based on the Stiles-Crawford effect. As another example, the transmittance profile may be or comprise a non-monotonically varying curve. The transmittance may be higher at pupil center and may decrease radially outwardly from the center until an increase at or adjacent the optical zone edge. The transmittance profile may have a maximum transmittance at the center of the optical zone and a minimum transmittance positioned at a radius less than the optical zone radius. Other profiles may be used.

Described herein are systems and/or methods for forming an ophthalmic lens. An example ophthalmic lens may comprise a main body configured to exhibit a power profile based on a power profile function defined by a base optical power, an amount of spherical aberration at a radial distance from a geometric center of the lens, and a bump function. The power profile may be optimized based at least on minimizing a shape metric of a through-focus curve. The bump function may comprise a multifocal function. The main body may be configured by configuring the geometric shape of the lens. The main body may be configured by configuring the internal gradient refractive index profile of the lens. The main body may be configured by configuring the geometric shape of the lens and the internal gradient refractive index profile of the lens. The main body may be configured such that light propagating through the lens is refracted to exhibit an adjusted power profile. The main body may be configured such that at least an intensity of light propagating through the lens is changed to exhibit a target apodization profile. The intensity of light propagating through the lens may be changed through apodization. The apodization of the lens may be based on a transmittance profile which may take any form. As an example, the transmittance profile may vary radially from the center of the lens. As another example, the transmittance profile may be based on the Stiles-Crawford effect. As another example, the transmittance profile may be or comprise a non-monotonically varying curve. The transmittance may be higher at pupil center and may decrease radially outwardly from the center until an increase at or adjacent the optical zone edge. The transmittance profile may have a maximum transmittance at the center of the optical zone and a minimum transmittance positioned at a radius less than the optical zone radius. Other profiles may be used.

Described herein are systems and/or methods for forming an ophthalmic lens. An example ophthalmic lens may comprise a main body configured to exhibit a power profile based on a power profile function defined by a base optical power, an amount of spherical aberration at a radial distance from a geometric center of the lens, and a bump function.

The power profile may provide vision correction and may be further optimized to slow myopia progression or treat presbyopia or emerging presbyopia based at least on minimizing a shape metric of a through-focus curve. The main body may be configured by configuring the geometric shape of the lens. The main body may be configured by configuring the internal gradient refractive index profile of the lens. The main body may be configured by configuring the geometric shape of the lens and the internal gradient refractive index profile of the lens. The main body may be configured such that light propagating through the lens is refracted to exhibit the power profile.

The main body may be configured such that at least an intensity of light propagating through the lens is changed to exhibit a target apodization profile. The intensity of light propagating through the lens may be changed through apodization. The apodization of the lens may be based on a transmittance profile defined by a continuous function. The apodization of the lens may be based on a transmittance profile which may take any form. As an example, the transmittance profile may vary radially from the center of the lens. As another example, the transmittance profile may be based on the Stiles-Crawford effect. As another example, the transmittance profile may be or comprise a non-monotonically varying curve. The transmittance may be higher at pupil center and may decrease radially outwardly from the center until an increase at or adjacent the optical zone edge. The transmittance profile may have a maximum transmittance at the center of the optical zone and a minimum transmittance positioned at a radius less than the optical zone radius. Other profiles may be used.

Described herein are systems and/or methods for forming an ophthalmic lens. An example method may comprise a step of determining a power profile based on a power profile function defined by a base optical power, an amount of spherical aberration at a radial distance from a geometric center of the lens, and a bump function. The example method may comprise a step of adjusting the power profile based at least on minimizing a shape metric of a through-focus curve. The example method may comprise a step of forming a lens to exhibit the adjusted power profile. Forming a lens may comprise configuring the geometric shape of the lens. Forming a lens may comprise configuring the internal gradient refractive index profile of the lens. Forming a lens may comprise configuring the geometric shape of the lens and the internal gradient refractive index profile of the lens. Forming a lens may comprise configuring a main body of the lens such that light propagating through the lens is refracted to exhibit an adjusted power profile.

Forming a lens may comprise configuring a main body of the lens such that at least an intensity of light propagating through the lens is changed to exhibit a target apodization profile. The intensity of light propagating through the lens may be changed through apodization. The apodization of the lens may be based on a transmittance profile which may take any form. As an example, the transmittance profile may vary radially from the center of the lens. As another example, the transmittance profile may be based on the Stiles-Crawford effect. As another example, the transmittance profile may be or comprise a non-monotonically varying curve. The transmittance may be higher at pupil center and may decrease radially outwardly from the center until an increase at or adjacent the optical zone edge. The transmittance profile may have a maximum transmittance at the center of the optical zone and a minimum transmittance positioned at a radius less than the optical zone radius. Other profiles may be used.

Other methods and lens design may be used.

EXAMPLES

Myopia typically occurs due to excessive axial growth or elongation of the eye. Based on animal research, axial eye growth may be influenced by the quality and focus of the retinal image. One of the risk factors for myopia development in humans is near work. When young eyes look at a near object through a contact lens, the accommodation systems actively adjust the crystal lens to form a sharp focal point on the retina or slightly behind the retina. The latest retinal image quality model, which takes into account three factors (accommodation system change, lens decentration, population aberration variation), found a correlation between the flatness of the through-focus retinal image quality and treatment efficacy for different contact lens designs, as illustrated in FIG. 1.

FIG. 1 shows example correlations between a flatness of a through-focus retinal image quality and an observed treatment efficacy for different contact lens designs.

The power profile of current design may be described as follows:

$$p(r) = p_0 + sa \times r^2 + \Psi(r), \quad (2)$$

wherein r represents a radial distance (millimeter (mm)) from a geometric lens center; $p_0$ represents the base power (diopters (D)) of the lens (e.g., the paraxial power which may comprise a spherical power, a cylindrical power, or a combination thereof); sa represents an amount of spherical aberration (D/mm$^2$); p(r) represents the lens power profile; and $\Psi(r)$ represents a bump function that is further described in equation (3).

$$\Psi(r) = \begin{cases} \left(\dfrac{h}{\exp(-1)}\right) \times \exp\left(-\dfrac{1}{1-\left[\dfrac{(r-r_0)}{(d/2)}\right]^{2n}}\right), r > 0 \text{ and } r \in \left]r_0 - \dfrac{d}{2}, r_0 + \dfrac{d}{2}\right[ \\ 0, \text{ otherwise} \end{cases} \quad (3)$$

wherein r represents a radial distance (mm) from a geometric lens center; h is the height (D) of the bump function; $r_0$ represents the center location (mm) of the bump function; d represents the width (mm) of the bump; and n is an integer such that n≥1 which represents the flatness of the bump.

FIGS. 2A-2D show example bump functions, and the role of each of the defining parameters. Various example bump functions are plotted in FIGS. 2A-2D. Comparing to a typical multifocal step, the power profile change of the bump function is gradual and continuous. With this feature being part of the optical design, it is easier for the design to achieve target vision correction with a relatively flat through-focus image quality curve.

Figure 3A:
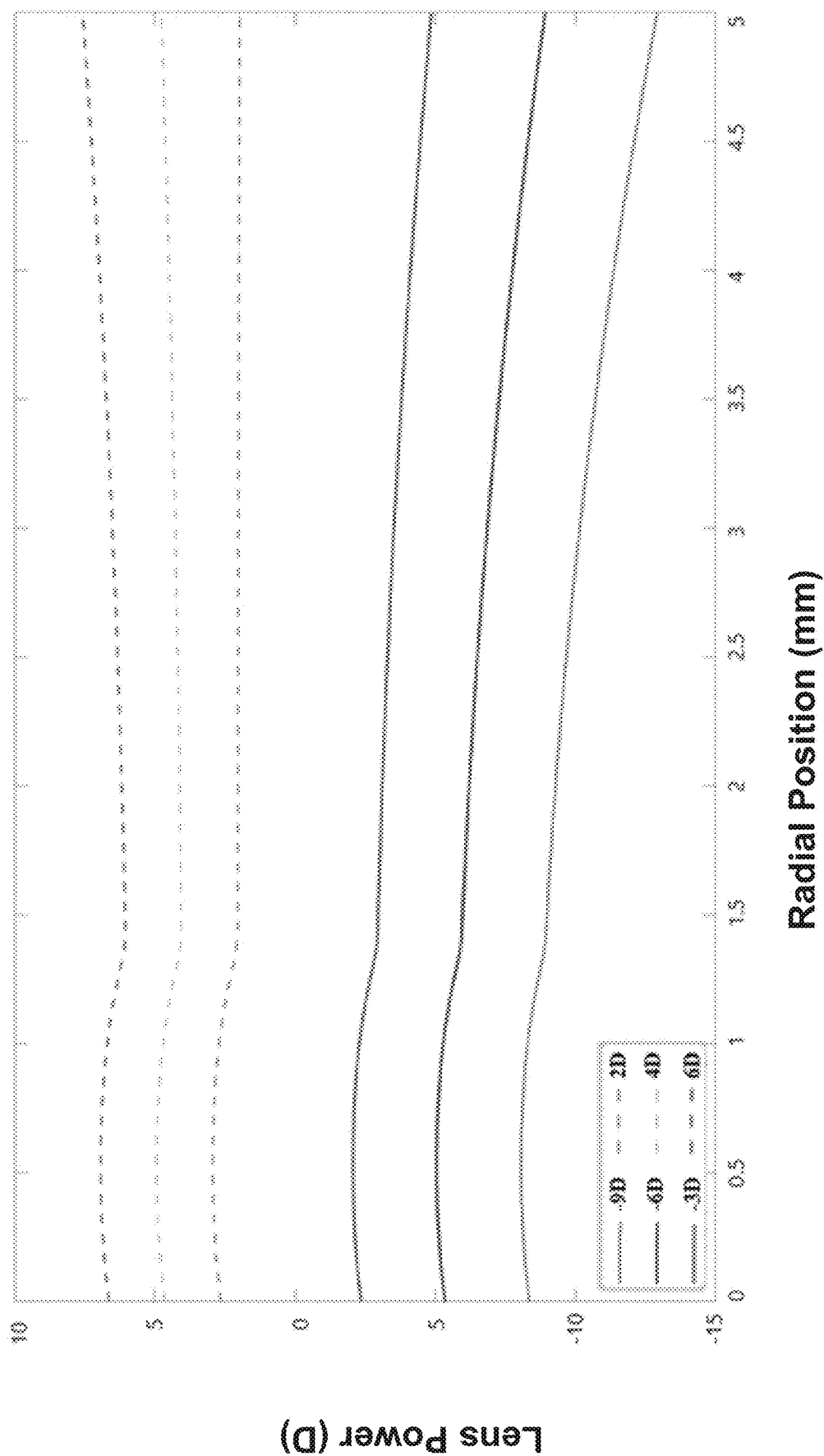
FIGS. 3A-3B show example plots of a power profile of a first example design. In both plots, designs for subjects with six different refractive errors are shown, Rx=−9D, Rx=−6D, Rx=−3D, Rx=2D, Rx=4D, Rx=6D.
Figure 3B:
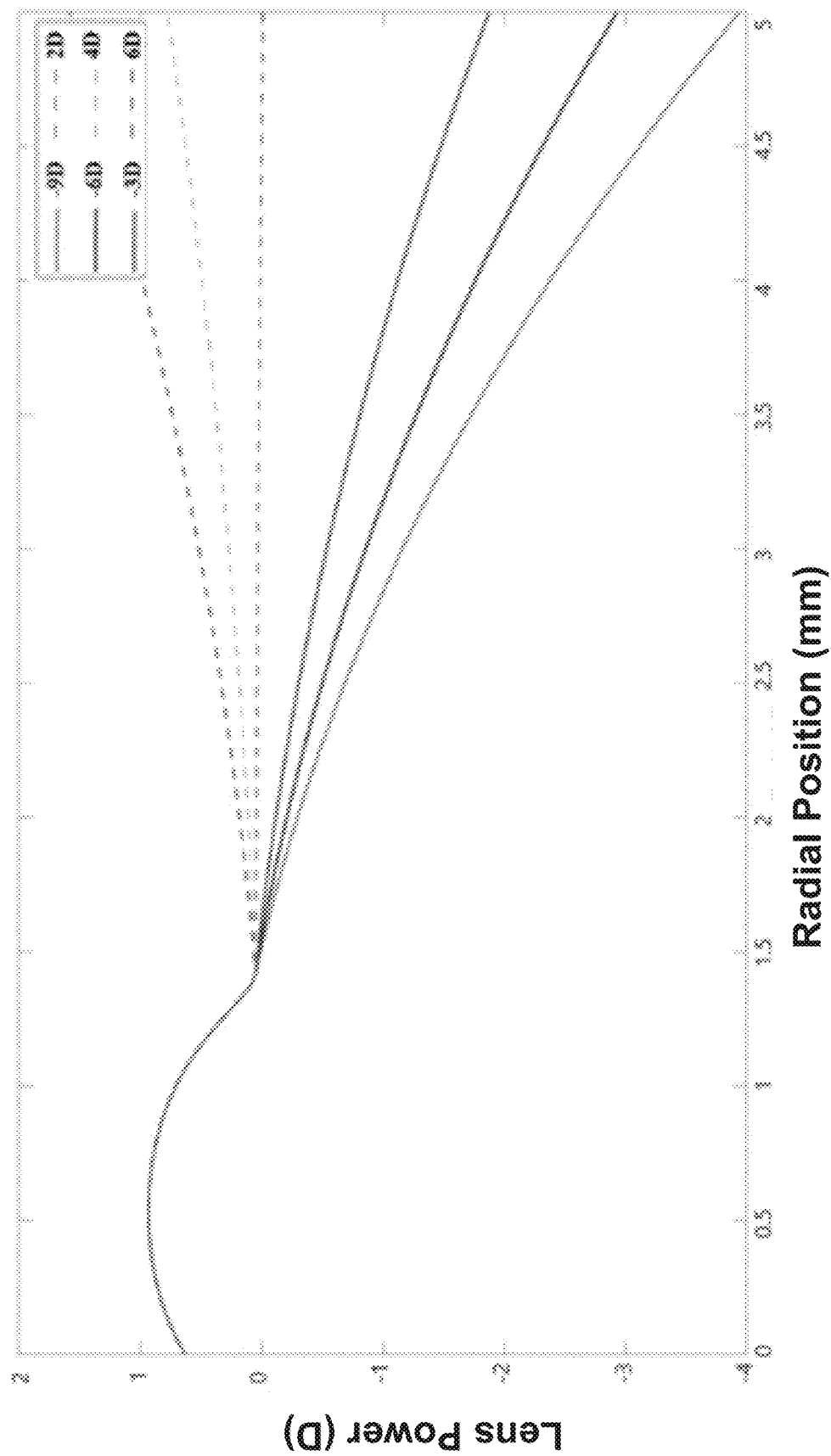

Table 1 shows parameter values for the power profile of an example design for prescription Rx =−3D FIGS. 3A-3B show plots for the power profile of examples designs for subjects with six different refractive errors: Rx=−9D, Rx=−6D, Rx=−3D, Rx=2D, Rx=4D, Rx=6D. Rx denotes the manifest spherical refraction of the subject. FIG. 3A shows the power profile and FIG. 3B shows the power profiles with refraction subtracted to highlight the manner in which the designs might vary with refraction.

TABLE 1

Parameter Values of Design Example I (Design I).

| Parameters | $p_0$ | sa | h | $r_0$ | d |
|---|---|---|---|---|---|
| Values | −2.8 D | −0.084 D/mm^2 | 2.09 D | 0.60 mm | 1.80 mm |

Figure 4:
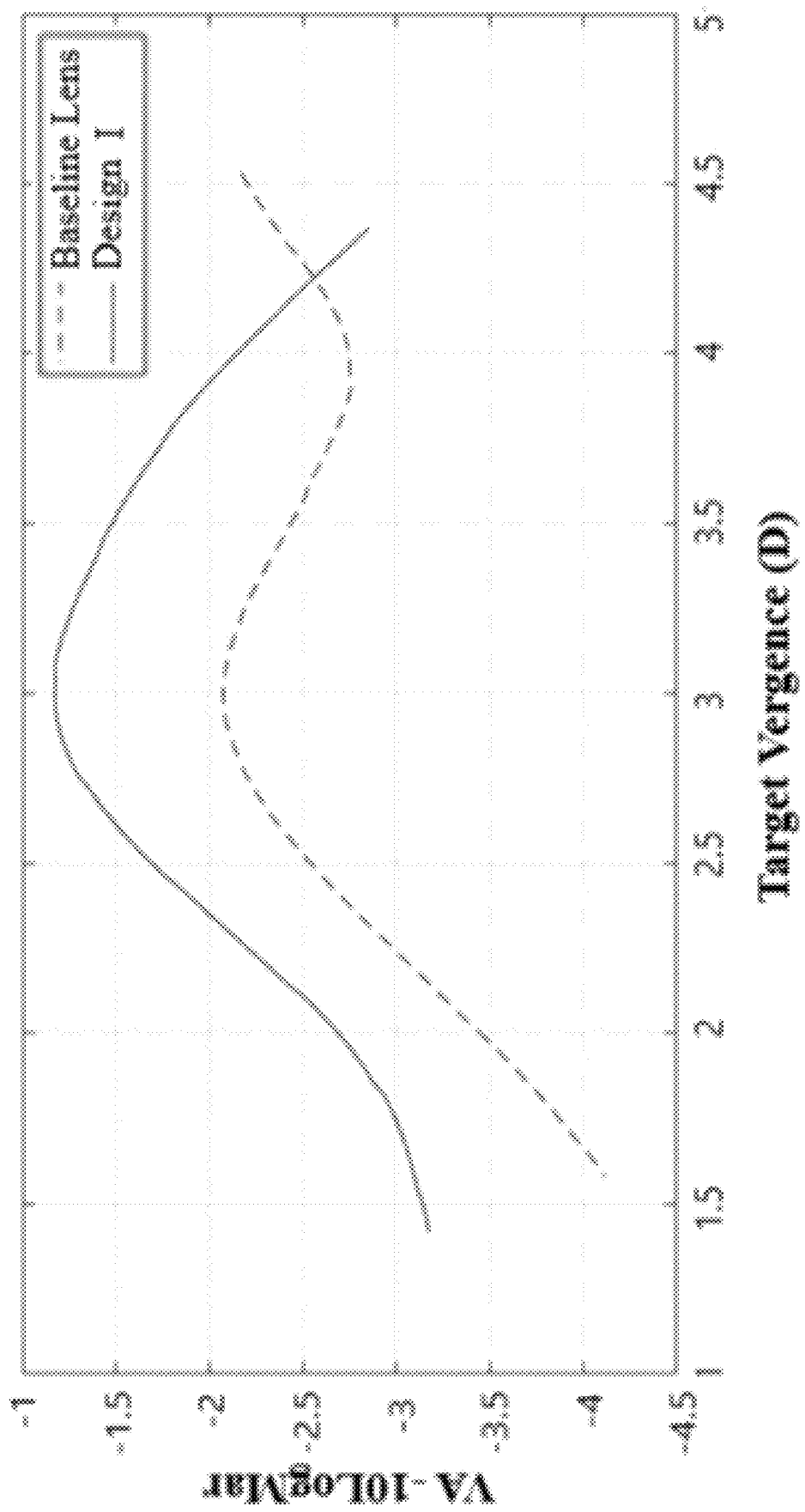
FIG. 4 shows through-focus image quality curves about a near vergence of 3D for the first example design and an example bifocal design (baseline lens).
Figure 13:
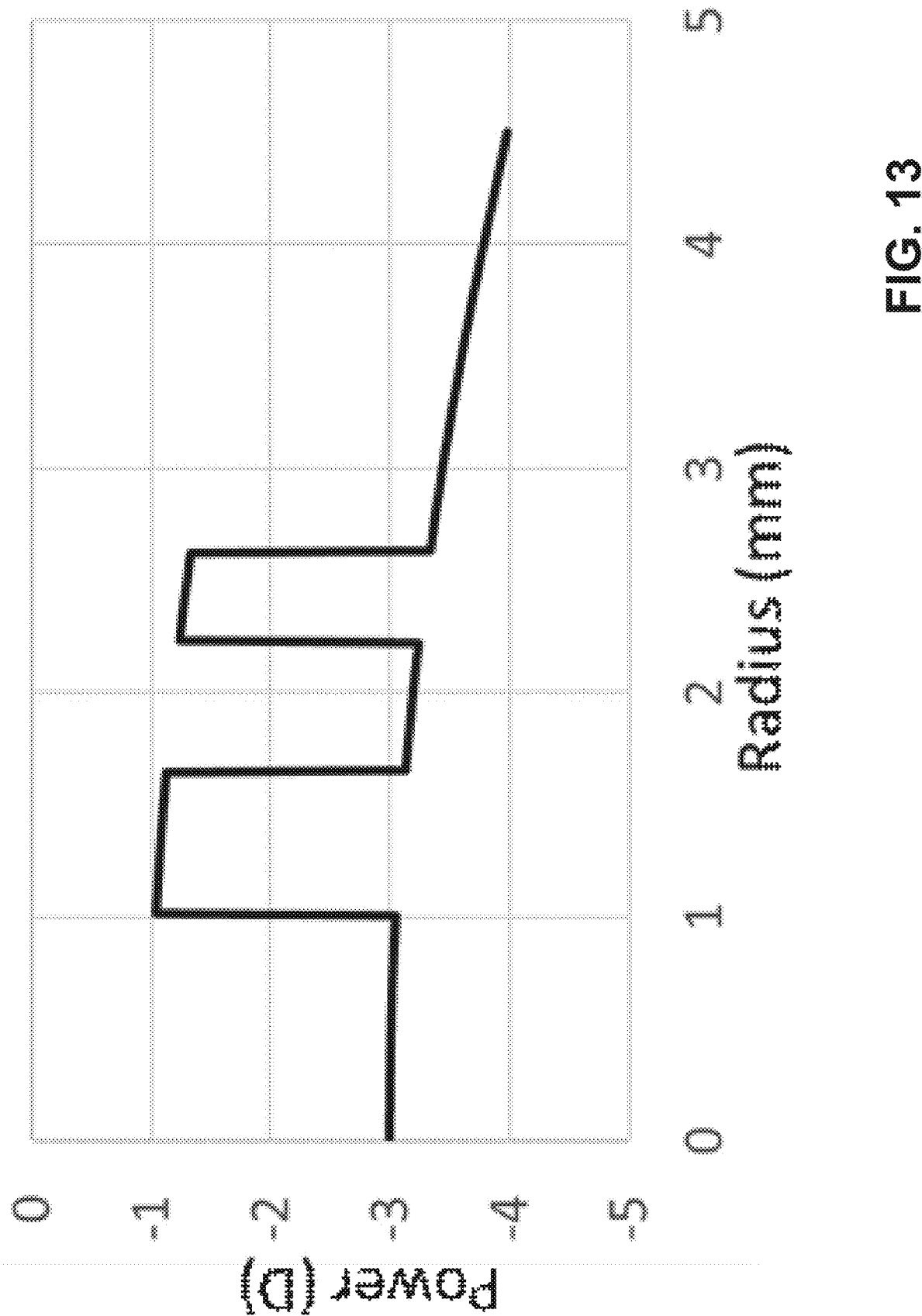
FIG. 13 shows an example plot of a power profile of the baseline lens.

In comparison with an example baseline lens with a power profile shown in FIG. 13, the simulated distance visual acuity of the new design (Design I) is approximately 1.2 lines of visual acuity better (VA −10 LogMAR). Moreover, as the through-focus curve of the new design is flatter than that of the baseline lens (as illustrated in FIG. 4), this new design is expected to be more efficacious in slowing down myopia progression than the baseline lens (as modeled in FIG. 5).

In practice, depending on the aberration pattern of the young eye at different accommodating states, the parameter ranges of the new design are summarized in Table 2 as follows:

TABLE 2

Parameter Ranges of Design Example I.

| Parameters | $p_0$ | sa | h | $r_0$ | d | n |
|---|---|---|---|---|---|---|
| Values | [−0.5, +0.5] from the Rx Power | [−0.05, 0.1] D/mm^2 | [0.1, 10] D | [0.4, 1.4] mm | [1.5, 2.1] mm | [1, ∞] |

Equations 1 and 2 outline the power profile of a lens design. In practice, the design may be fabricated either by adjusting the geometric shape of the lens and/or by changing the internal gradient refractive index profile of the lens. As a result, the light propagating through the lens is refracted resulting in a desired power profile.

In addition, the light intensity may also be adjusted by the method of apodizing the lens from the center to the periphery in transmittance. Such a transmittance profile may take any form and may vary radially from the center of the lens. For example, the transmittance profile may decrease from the center of the lens to a middle point and then may increase again from the middle point to a peripheral point. As another example, the transmittance profile may be based on the Stiles-Crawford effect. As another example, the transmittance profile may be or comprise a non-monotonically varying curve. The transmittance may be higher at pupil center and may decrease radially outwardly from the center until an increase at or adjacent the optical zone edge. The transmittance profile may have a maximum transmittance at the center of the optical zone and a minimum transmittance positioned at a radius less than the optical zone radius. Other profiles may be used. The transmittance profile may be represented by many mathematical formulae or equations such as a piecewise cubic Hermite interpolating polynomial curve controlled by a series number of points (See Fritsch et al., Monotone Piecewise Cubic Interpolation, SIAM J. Numerical Analysis, Vol. 17, 1980, pp. 238-46.) A transmittance profile may be defined by a continuous function, with a non-monotonically varying transmittance. As an example, a maximum of transmittance is at pupil center and a minimize value is positioned less than optical zone (OZ radius). As another example, the transmittance is based on a polynomial function such as:

$T=(-0.4179r^7+5.1596r^6-24.399r^5+54.5187r^4-57.4684r^3+35.308r^2-46.6963r+100.1505)/100$

A lens with such an apodization profile may be fabricated by incorporating light absorbing compounds into the reactive monomer mixture from which the lens is made, by pad printing light absorbing patterns onto the molds between which the lens is made which are subsequently incorporated into the lens upon curing, by embedding rigid apodized inserts into the lens, by post-fabrication methods of impregnation or chemical grafting of light absorbing compounds into or onto the lens, or the like. The light absorbing compounds may be reactive or nonreactive, organic or organometallic dyes, coated or uncoated nanoparticles, or the like, and combinations thereof.

This disclosure provides an example design (Design II) that manipulates the light by refraction and apodization. The power profile of Design II is the same as Design I. The parameter values used to describe the power profile of Design II are the same as those in Table 1. The control points that describe the transmittance profile are summarized in Table 3.

TABLE 3

Parameter Values (Intensity) of Design Example II (Design II).

| Parameters for Transmittance | Point #1 | Point #2 | Point #3 |
|---|---|---|---|
| Radial Position | 0 mm | 1.75 mm | 3.5 mm |
| Transmittance | 100% | 57% | 68% |

Figure 5:
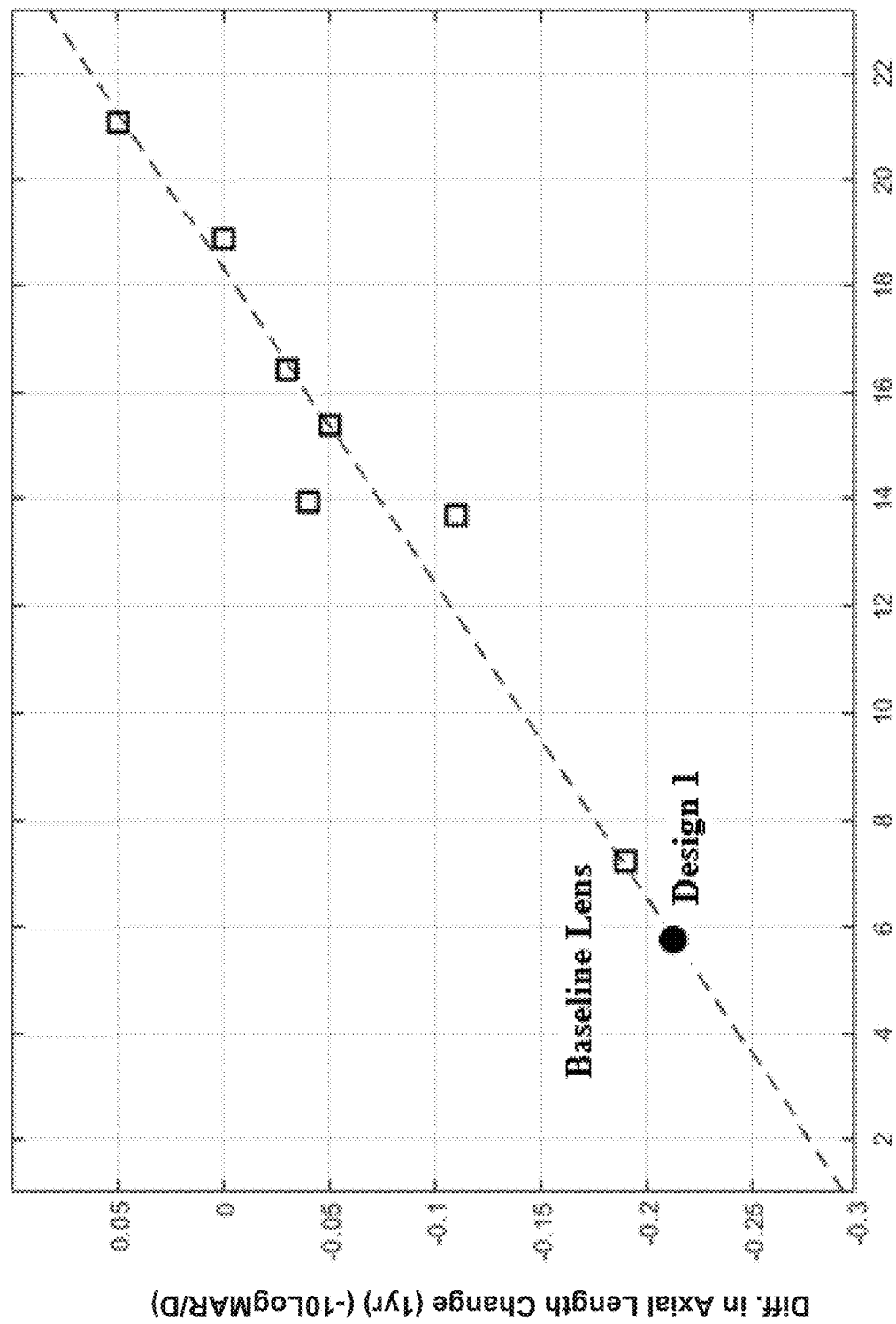
FIG. 5 shows a model prediction on treatment efficacy of the first example design.
Figure 6:
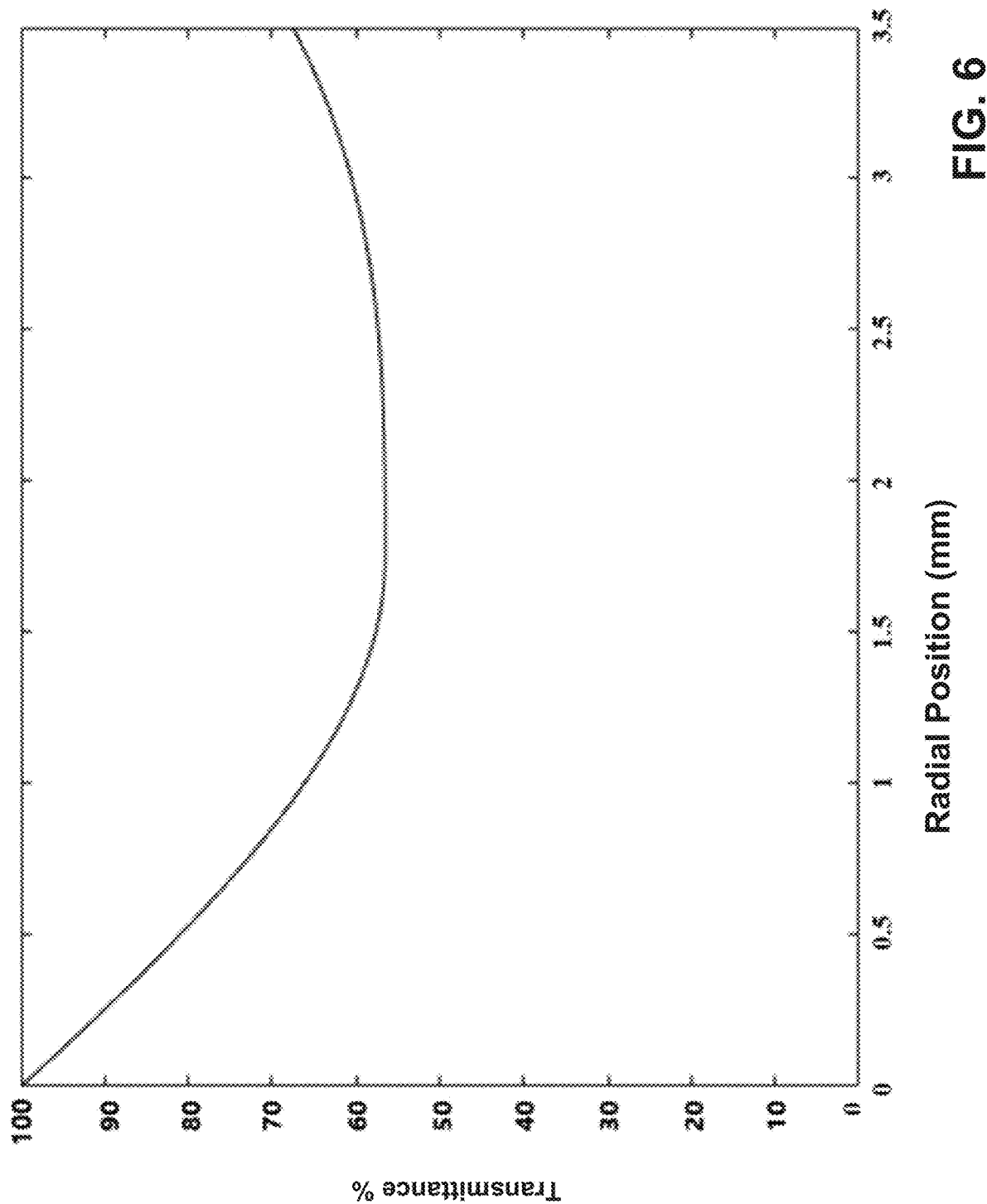
FIG. 6 shows an example plot of a transmittance profile of a second example design.
Figure 7:
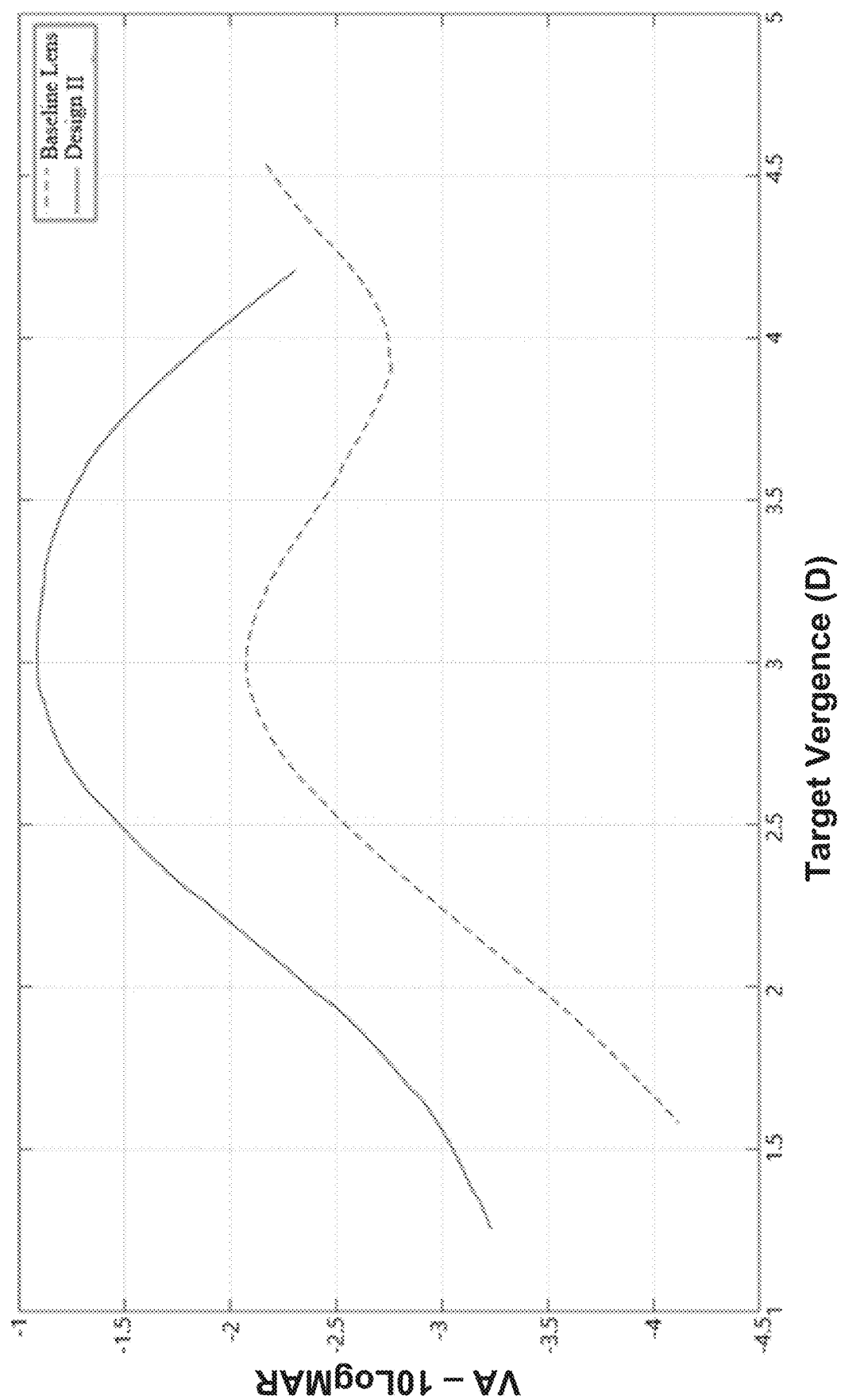
FIG. 7 shows through-focus image quality curves about a near vergence of 3D for the second example design and an example bifocal design (baseline lens).
Figure 8:
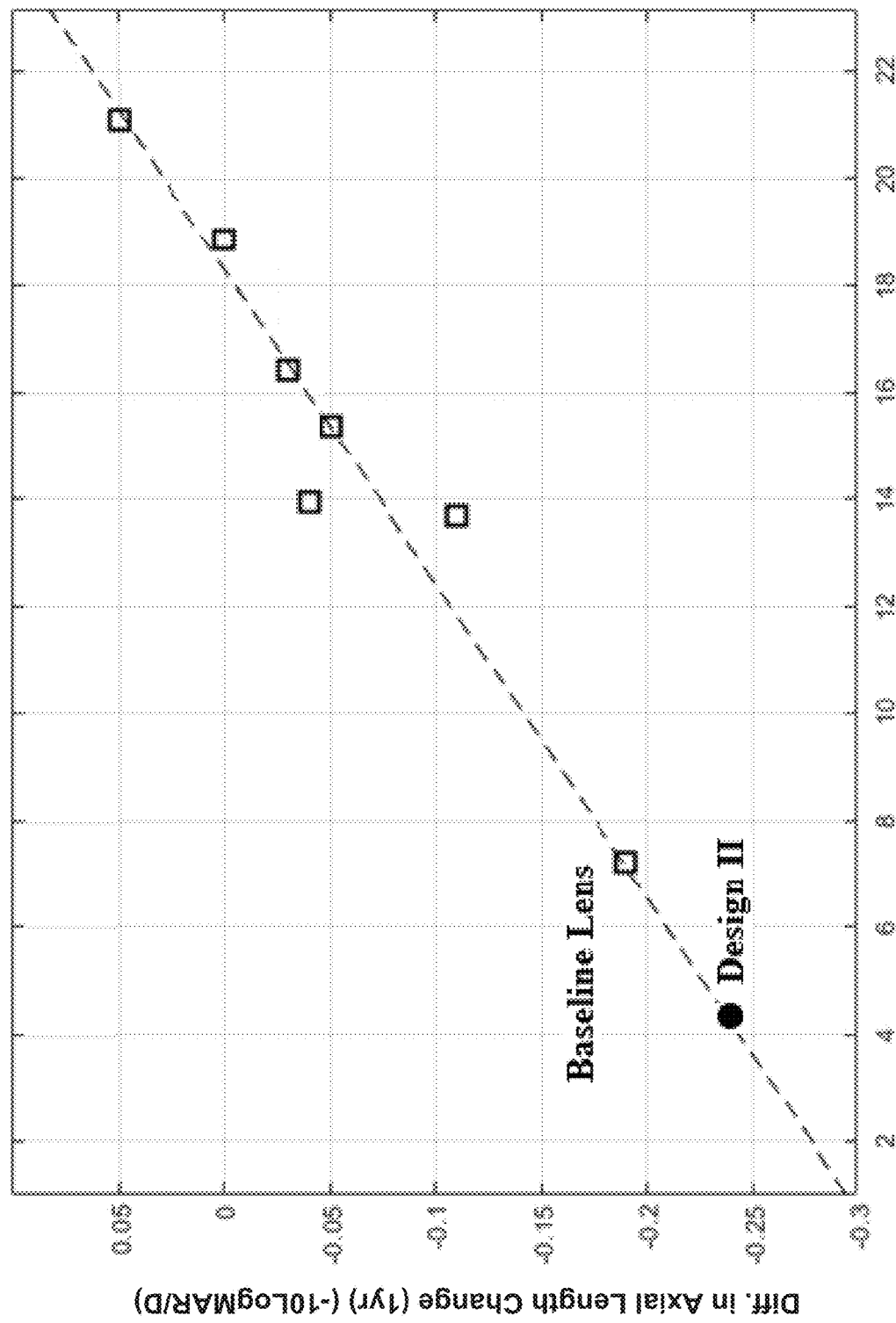
FIG. 8 shows a model prediction on treatment efficacy of the second example design.

The transmittance profile of Design II is shown in FIG. 6. As a result of the combined features of power profile and transmittance apodization profile, the effectiveness of vision correction of the Design II is similar, and slightly better, than Design I and better than the baseline lens. As an example, Design 2 modelled as −0.75 VA−10 LogMAR compared to the baseline lens, which modelled as about −2 VA−10 LogMAR. However, as the through-focus curve of Design II is flatter than Design I (FIG. 7 vs FIG. 4), Design II is expected to be more efficacious in slowing down myopia progression than Design I and the baseline lens (FIG. 8 vs FIG. 5).

Besides the bump design modality, multifocal design forms may also be used to yield the maximized balanced benefit of vision correction and treatment efficacy in controlling myopia. These multifocal designs are also applicable in vision corrections for presbyopes or emerging presbyopes.

The power profile of multifocal designs may be described as follows:

$$p(r) = p_0 + sa \times r^2 + M(r) \quad (4)$$

wherein r represents a radial distance from a geometric lens center; $p_0$ represents the base power of the lens; sa represents an amount of spherical aberration; p(r) represents the lens power profile; and M(r) represents a multifocal function that is further described in equation (5).

$$M(r) = \begin{cases} addpower, & r_1^{min} \le r \le r_1^{max} \\ addpower, & r_2^{min} \le r \le r_2^{max} \\ 0, & \text{otherwise} \end{cases} \quad (5)$$

wherein r represents a radial distance (mm) from a geometric lens center; $r_1^{min}$ and $r_1^{max}$ represent the locations of inner and outer boundaries of the $1^{st}$ add zone (mm); $r_2^{min}$ and $r_2^{max}$ represent the locations of inner and outer boundaries of the $2^{nd}$ add zone (mm); and addpower represents the magnitude of the add power (D).

Equations 4 and 5 may specify the power profile of a lens design. In practice, the design may be fabricated by adjusting the geometric shape of the lens and/or by changing the internal gradient refractive index profile of the lens. As a result, light propagating through the lens is refracted resulting in the desired power profile. Other methods may be used.

Alternatively, the power profile of multifocal designs may be described as:

$$p(r) = p_0 + sa \times r^2 + N(r), \quad (6)$$

wherein r represents a radial distance from a geometric lens center; $p_0$ represents the base power of the lens; sa represents an amount of spherical aberration; p(r) represents the lens power profile; and N(r) represents a bump multifocal function that is further described in equation (7).

$$N(r) = \begin{cases} \Psi(r), & r_1^{min} \le r \le r_1^{max} \\ \Psi(r), & r_2^{min} \le r \le r_2^{max} \\ 0, & \text{otherwise} \end{cases} \quad (7)$$

wherein $r_{o1} = r_1^{min} + (r_1^{max} - r_1^{min})/2$ represents the center location of the first bump add zone; $r_{o2} = r_2^{min} + (r_2^{max} - r_2^{min})/2$ represents the center location of the first bump add zone.

Figure 9:
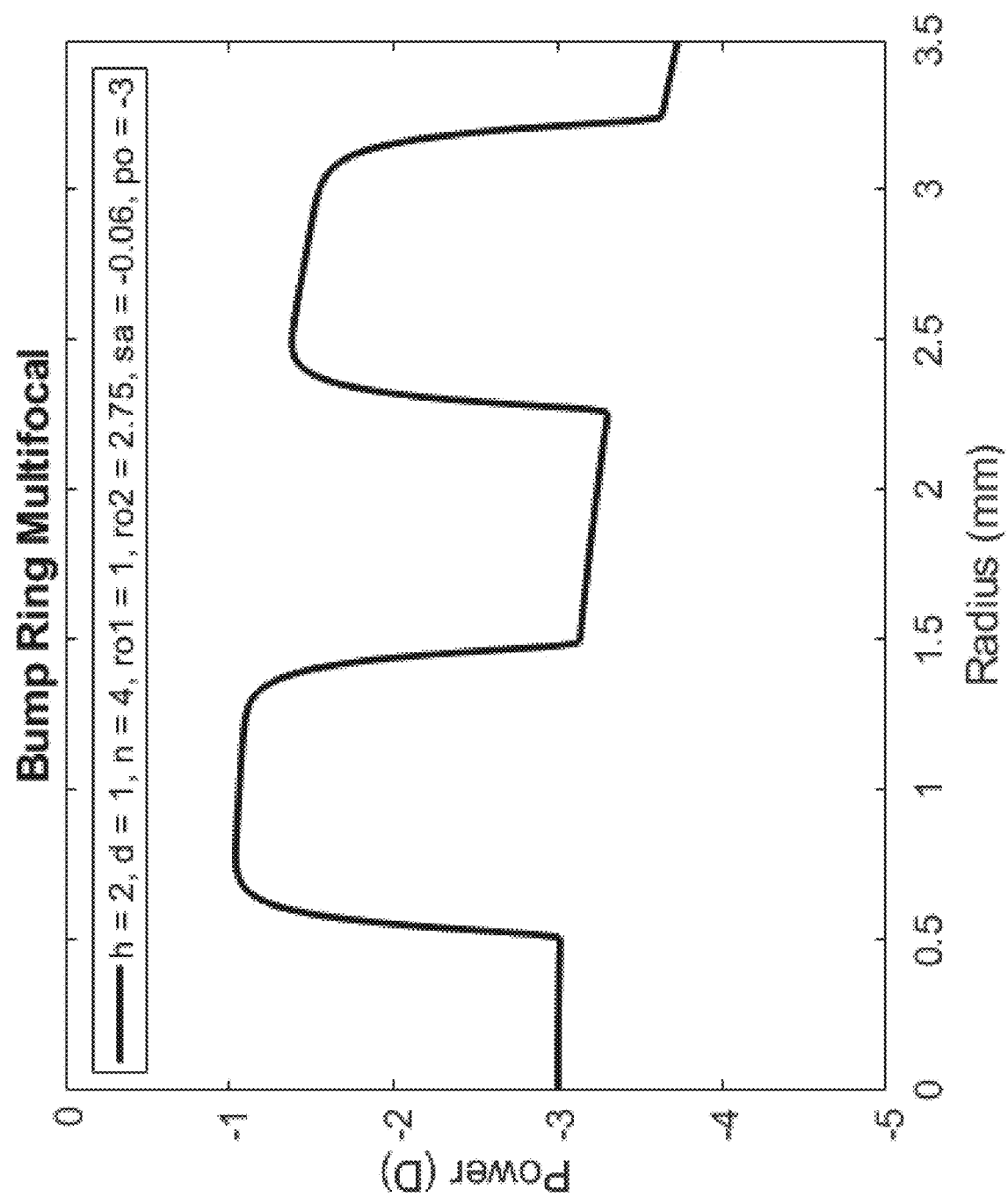
FIG. 9 shows an example plot of a power profile of a third example design.

The power profile of such an example multifocal design (Design III) (Rx: −3D) using equation (7) and the design parameters listed in Table 4 is shown in FIG. 9.

TABLE 4

Parameter Values of the example multifocal design.

| Parameters | $p_0$ | sa | $r_1^{min}$ | $r_1^{max}$ | $r_2^{min}$ | $r_2^{max}$ | addpower |
|---|---|---|---|---|---|---|---|
| Values | −3.0 D | −0.06 D/mm^2 | 1.2 mm | 1.8 mm | 2.25 mm | 2.60 mm | 1.5 D |

Figure 10:
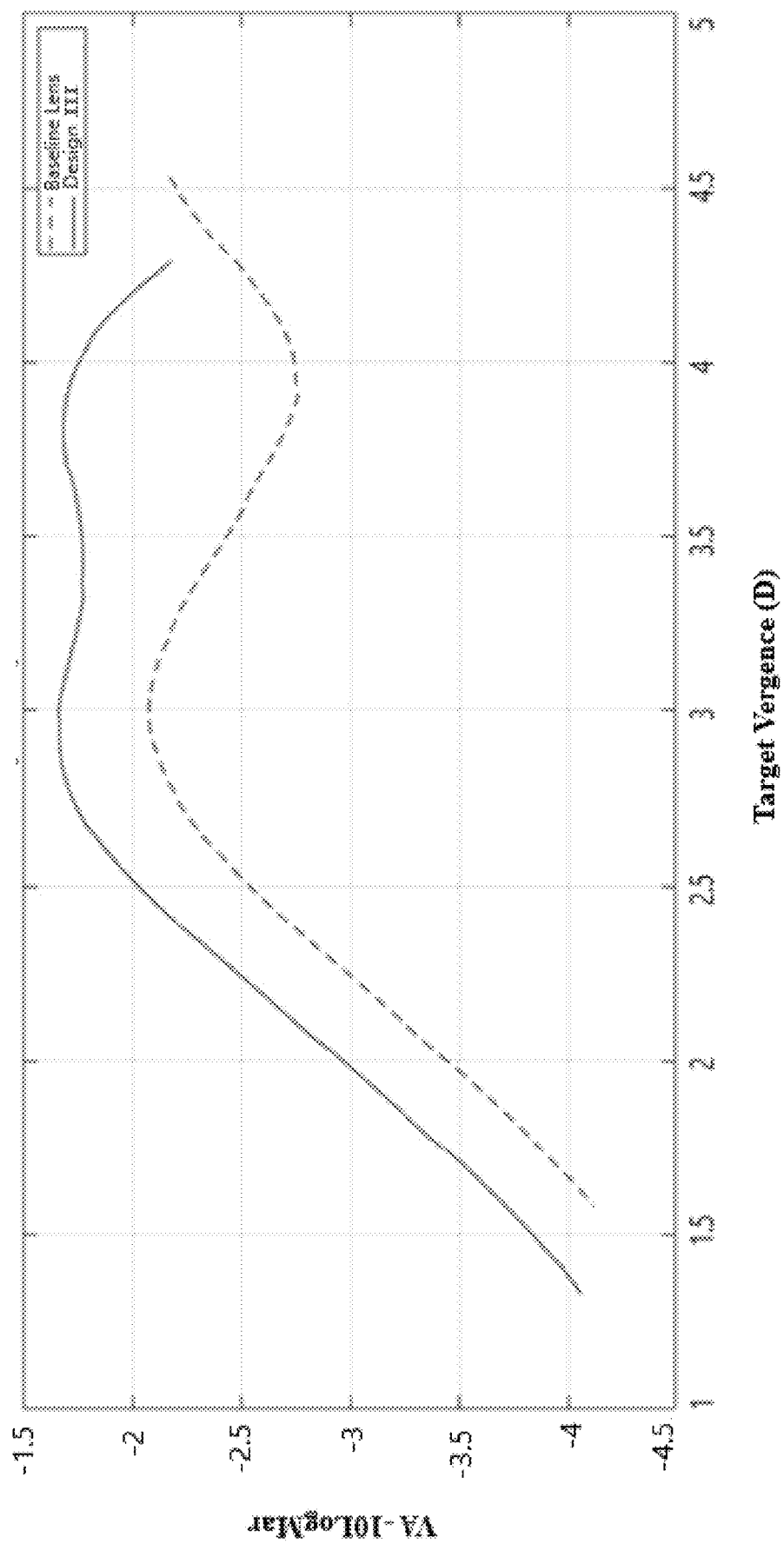
FIG. 10 shows through-focus image quality curves about a near vergence of 3D for the third example design and an example bifocal design (baseline lens).
Figure 11:
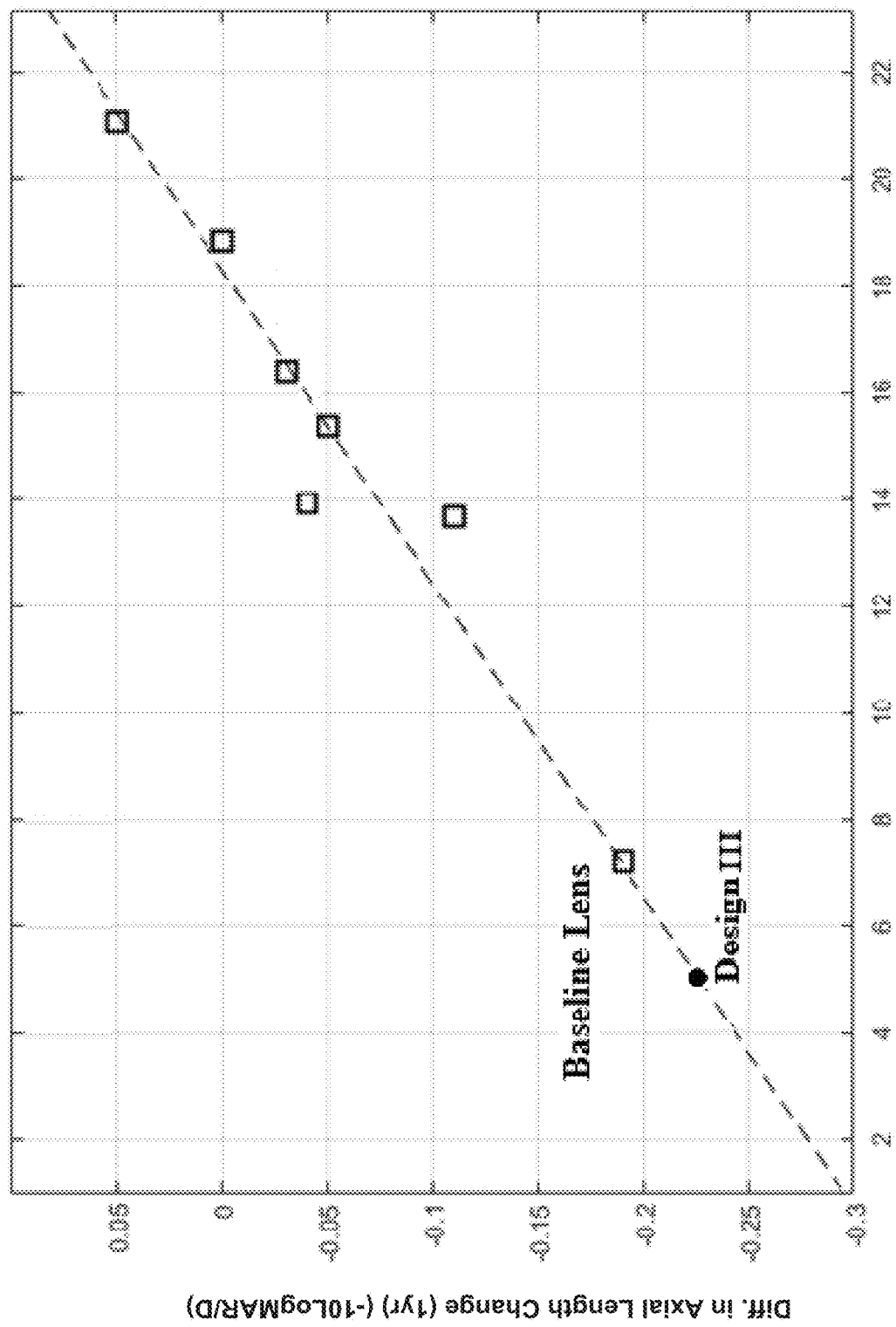
FIG. 11 shows a model prediction on treatment efficacy of the third example design.

In comparison with the baseline lens, the simulated distance visual acuity of Design III is 1 letter better. Moreover, as the through-focus curve of Design III is flatter than that of the baseline lens (FIG. 10), Design III is expected to be more efficacious in slowing down myopia progression than the baseline lens (FIG. 11).

In practice, depending on the aberration pattern of the young eye at different accommodating states, the parameter ranges of the example multifocal design are summarized in the table as follows:

TABLE 5

Parameter Ranges of example multifocal design

| Parameters | $p_0$ | sa | $r_1^{min}$ | $r_1^{max}$ | $r_2^{min}$ | $r_2^{max}$ | addpower |
|---|---|---|---|---|---|---|---|
| Values | [−0.5, +0.5] from the Rx Power | [−0.03, 0.09] D/mm^2 | [1.0, 1.4] mm | [1.6, 2.0] mm | [2.05, 2.45] mm | [2.40, 2.80] mm | [1.3, 1.7] D |

The above described designs are intended to flatten through-focus curves and to maintain good vision correction. The designs are also applicable in vision corrections for presbyopes or emerging presbyopes. Therefore, the new Designs I, II, and III originally created for myopia control are also applicable in correcting emerging presbyopia and presbyopia.

Figure 12:
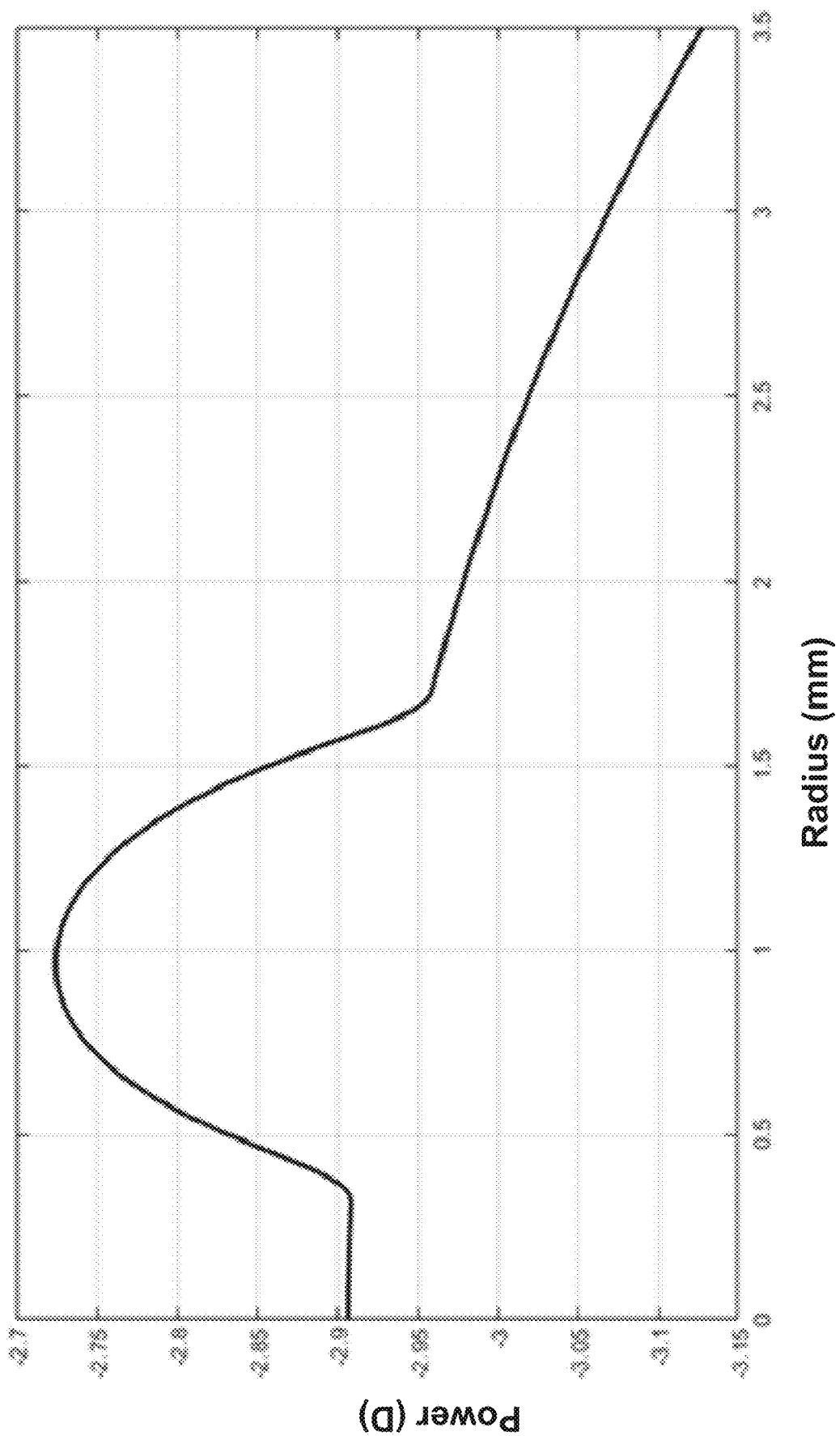
FIG. 12 shows an example plot of a power profile of a fourth example design.

The power profile of another example design (Design IV) (Rx: −3D) using equation (6) and design parameters listed in Table 6 for correcting emerging presbyopia (EP) is shown in FIG. 12.

TABLE 6

Parameter Values of EP Design Example.

| Parameters | $p_0$ | sa | h | $r_0$ | d |
|---|---|---|---|---|---|
| Values | −2.91 D | −0.02 D/mm^2 | 0.2 exp(1) mm | 1.01 mm | 1.47 mm |

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. An ophthalmic lens for slowing myopia progression, comprising:

a power profile defined by the following equation:

$$p(r)=p_0+sa\times r^2+\Psi(r),$$

where r represents a radial distance (mm) from a geometric lens center; $p_0$ represents a base power of the lens in diopters (D), sa represents an amount of spherical aberration (D/mm$^2$), p(r) represents the lens power profile, and $\Psi(r)$ represents a bump function that is further defined by the following equation:

$$\Psi(r) = \begin{cases} \left(\dfrac{h}{\exp(-1)}\right)\times \exp\left(-\dfrac{1}{1-\left[\dfrac{(r-r_0)}{(d/2)}\right]^{2n}}\right), r > 0 \text{ and } r \in \left]r_0-\dfrac{d}{2}, r_0+\dfrac{d}{2}\right[ \\ 0, \text{ otherwise} \end{cases}$$

where h is the height (D) of the bump function, $r_0$ represents the center location (mm) of the bump function, d represents the width (mm) of the bump function, and n is an integer such that n>=1 which represents a flatness of the bump function;

and a transmittance profile that varies from the lens center to a lens periphery, wherein the transmittance profile improves myopia control efficacy and visual acuity of the lens as compared to a lens having the same power profile without an apodization profile.

2. The ophthalmic lens according to claim 1, wherein a transmittance is highest at the lens center.

3. The ophthalmic lens according to claim 2, wherein transmittance decreases from the lens center to a first radial distance from lens center, then increases from the first radial distance to a second radial distance from lens center that is greater than the first radial distance.

4. The ophthalmic lens according to claim 3, wherein the second radial distance is less than an optical zone radius of said ophthalmic lens.

5. The ophthalmic lens according to claim 3, wherein transmittance at lens center is 100%, the first radial distance is 1.75 mm and transmittance at the first radial distance is about 57%, and the second radial distance is 3.5 mm and transmittance at the second radial distance is about 68%.

6. The ophthalmic lens according to claim 1, wherein the transmittance profile comprises a non-monotonically varying curve.

7. The ophthalmic lens according to claim 1, wherein the transmittance (T) is based on a polynomial function defined as $$T=(-0.4179r^7+5.1596r^6-24.399r^5+54.5187r^4-57.4684r^3+35.308r^2-46.6963r+100.1505)/100.$$

8. An ophthalmic lens for slowing myopia progression, comprising:

a power profile defined by the following equation $$p(r)=p_0+sa\times r^2+\Psi(r)$$

where r represents a radial distance (mm) from a geometric lens center; $p_0$ represents a base power of the lens in diopters (D), sa represents an amount of spherical aberration (D/mm$^2$), p(r) represents the lens power profile, and $\Psi(r)$ represents a bump function that is further defined by the following equation:

$$\Psi(r) = \begin{cases} \left(\dfrac{h}{\exp(-1)}\right)\times \exp\left(-\dfrac{1}{1-\left[\dfrac{(r-r_0)}{(d/2)}\right]^{2n}}\right), r > 0 \text{ and } r \in \left]r_0-\dfrac{d}{2}, r_0+\dfrac{d}{2}\right[ \\ 0, \text{ otherwise} \end{cases}$$

where h is the height (D) of the bump function, $r_0$ represents the center location (mm) of the bump function, d represents the width (mm) of the bump function, and n is an integer such that n>=1 which represents a flatness of the bump, and wherein parameter ranges for the lens are:
-0.5<=$p_0$<=+0.5D from the base power;
-0.05<=sa<=+0.1 D/mm$^2$;
+0.1<=h,=10 D;
0.4<=$r_0$ <=1.4 mm;
1.5<=d<=2.1 mm;
1<=n<=∞.

9. The ophthalmic lens according to claim 8, further comprising a transmittance profile that varies from the lens center to a lens periphery.

10. The ophthalmic lens according to claim 9, wherein a transmittance is highest at the lens center.

11. The ophthalmic lens according to claim 10, transmittance decreases from the lens center to a first radial distance from lens center, then increases from the first radial distance to a second radial distance from lens center that is greater than the first radial distance.

12. The ophthalmic lens according to claim 11, wherein the second radial distance is less than an optical zone radius of said ophthalmic lens.

13. The ophthalmic lens according to claim 11, wherein the transmittance at lens center is 100%, the first radial distance is 1.75 mm and transmittance at the first radial distance is about 57%, and the second radial distance is 3.5 mm and transmittance at the second radial distance is about 68%.

14. The ophthalmic lens according to claim 9, wherein the transmittance profile comprises a non-monotonically varying curve.

15. The ophthalmic lens according to claim 9, wherein the transmittance (T) is based on a polynomial function defined as $$T=(-0.4179r^7+5.1596r^6-24.399r^5+54.5187r^4-57.4684r^3+35.308r^2-46.6963r+100.1505)/100.$$

* * * * *